United States Patent
Jaworowski et al.

(10) Patent No.: US 8,110,295 B2
(45) Date of Patent: Feb. 7, 2012

(54) FLUORINE EXTRACTION PROCESS FOR FLUORO-REFRACTORY COATINGS AND ARTICLES MANUFACTURED ACCORDING TO SAID PROCESS

(75) Inventors: Mark R. Jaworowski, Glastonbury, CT (US); James T. Beals, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 797 days.

(21) Appl. No.: 11/848,580

(22) Filed: Aug. 31, 2007

(65) Prior Publication Data
US 2009/0060828 A1    Mar. 5, 2009

(51) Int. Cl.
*C01B 7/19*    (2006.01)
(52) U.S. Cl. ......... 428/696; 423/500; 428/701; 428/702
(58) Field of Classification Search ........................ None
See application file for complete search history.

(56) References Cited

U.S. PATENT DOCUMENTS

| | | | |
|---|---|---|---|
| 2,898,250 A * | 8/1959 | Pimbley | 148/271 |
| 2,976,193 A * | 3/1961 | Pimbley | 148/266 |
| 3,066,055 A * | 11/1962 | Pimbley | 148/268 |
| 4,111,866 A * | 9/1978 | Torikai et al. | 521/53 |
| 4,778,833 A * | 10/1988 | Van der Drift et al. | 523/177 |
| 5,146,299 A * | 9/1992 | Lampe et al. | 257/295 |
| 5,686,151 A * | 11/1997 | Imai et al. | 427/576 |
| 5,830,424 A * | 11/1998 | Jomoto et al. | 423/293 |
| 2003/0150525 A1* | 8/2003 | Briles et al. | 148/254 |
| 2006/0068313 A1* | 3/2006 | Nakayama et al. | 430/109.4 |
| 2006/0081870 A1* | 4/2006 | Katoh et al. | 257/99 |
| 2007/0141506 A1* | 6/2007 | Inoue et al. | 430/137.15 |

* cited by examiner

*Primary Examiner* — Jennifer McNeil
*Assistant Examiner* — Vera Katz
(74) *Attorney, Agent, or Firm* — Bachman & LaPointe, P.C.

(57) ABSTRACT

A process for extracting fluorine from a fluoro-refractory coating includes the steps of providing an article having a fluoro-refractory coating; treating hydrothermally the fluoro-refractory coating at a temperature and for a period time sufficient to liberate a quantity of fluoride from the fluoro-refractory coating; and drying a hydrothermally treated article.

8 Claims, 2 Drawing Sheets

FLUORINE EXTRACTION PROCESS FOR FLUORO-REFRACTORY COATINGS AND ARTICLES MANUFACTURED ACCORDING TO SAID PROCESS

FIELD OF THE INVENTION

The invention relates to fluoro-refractory coatings and, more particularly, relates to a fluorine extraction process for fluoro-refractory coatings and articles manufactured according to said process.

BACKGROUND OF THE INVENTION

Fluoro-refractory coatings have been widely used in metal surface treatment of improved corrosion inhibition and improved adhesion of a subsequently applied paint layer. Fluoro-refractory coatings are applied through chemical reactions between the metal and the bath solution which converts or modifies the metal surface into a thin film with required functional properties. Fluoro-refractory coatings are particularly useful in surface treatment of metals such as steel, zinc, aluminum and magnesium.

A common example of fluoro-refractory coatings is a chromium conversion coating. Chromium conversion coatings are typically applied in any one of a number of processes using a dilute aqueous acid solution of a chromate complex followed by a water rinse. Most often, the dilute aqueous acid solution contained hydrofluoric acid (HF1). Generally, fluoro-refractory coatings containing hafnium, zirconium or titanium are applied in the same manner.

It has been discovered, as fluoro-refractory coatings fail, that the corrosion products associated with the failure contain a higher concentration of fluorine than the coating as initially applied. To the best of the knowledge of the inventors of the present application, the following observation is best explained as follows. Fluoro-refractory coatings formed on substrates, such as aluminum, etc., absorb a quantity of fluorine when the fluoro-refractory coating is applied as a result of incomplete hydrolysis of precursors, such as potassium or sodium fluorozirconate or fluorotitanate, fluorozirconic or fluorotitanic acid, or from substrate reaction products such as aluminum fluoride. During operation of the coated article, fluorine slowly leaches out of the coating and reacts with ambient water to form hydrofluoric acid, HF. Being corrosive, HF begins eroding the fluoro-refractory coating thus causing pitting and general corrosion, etc. and exposing the substrate to the atmosphere and elements. Such exposure in turn significantly shortens the useful lifecycle of the article, that is, a part, e.g., a gas turbine engine.

Therefore, there exists a need for a process for extracting fluorine from a fluoro-refractory coating.

SUMMARY OF THE INVENTION

In accordance with one aspect of the present disclosure, a process for extracting fluorine from a fluoro-refractory coating broadly comprises the steps of providing an article having a fluoro-refractory coating; treating hydrothermally the fluoro-refractory coating at a temperature and for a period time sufficient to liberate a quantity of fluoride from the fluoro-refractory coating; and drying a hydrothermally-treated article.

In accordance with another aspect of the present disclosure, a process for extracting fluorine from a chromium conversion coating broadly comprises the steps of providing an article having a chromium conversion coating; treating hydrothermally the chromium conversion coating at a temperature and for a period of time sufficient to liberate a quantity of fluoride from the chromium conversion coating; and drying a hydrothermally-treated article.

In accordance with yet another aspect of the present disclosure, an article broadly comprises a fluorine-free fluoro-refractory coating made in accordance with a process broadly comprising the steps of providing an article having a fluoro-refractory coating; treating hydrothermally said fluoro-refractory coating at a temperature and for a period time sufficient to liberate a quantity of fluoride from said fluoro-refractory coating; and drying a hydrothermally-treated article.

In accordance with still yet another aspect of the present disclosure, a hydrothermally-treated article broadly comprises at least one surface having a fluoro-refractory coating disposed thereupon, wherein the fluoro-refractory coating is free of fluoride.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
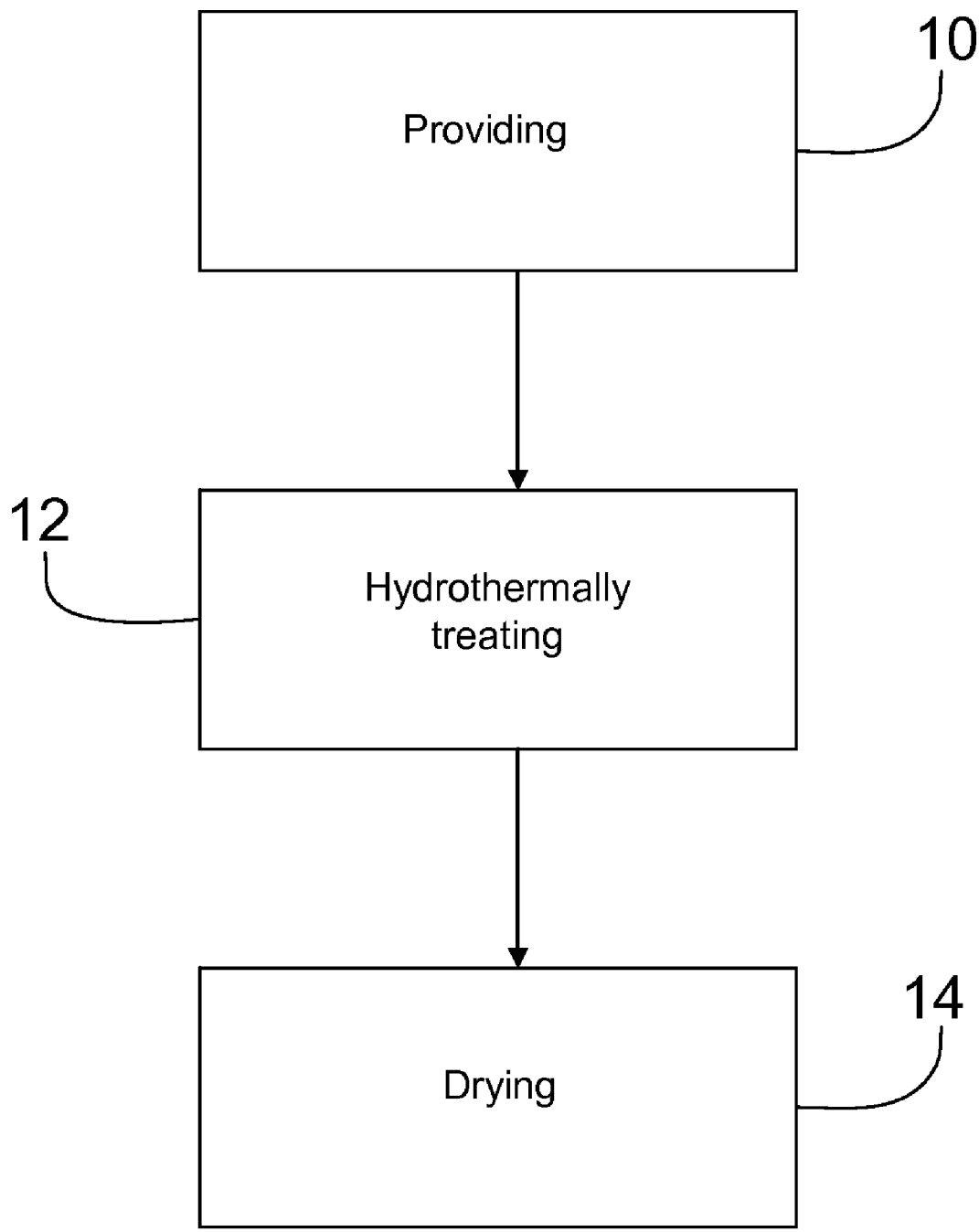
FIG. 1 is a flowchart representing an exemplary embodiment of the exemplary process of the present disclosure.
Figure 2:
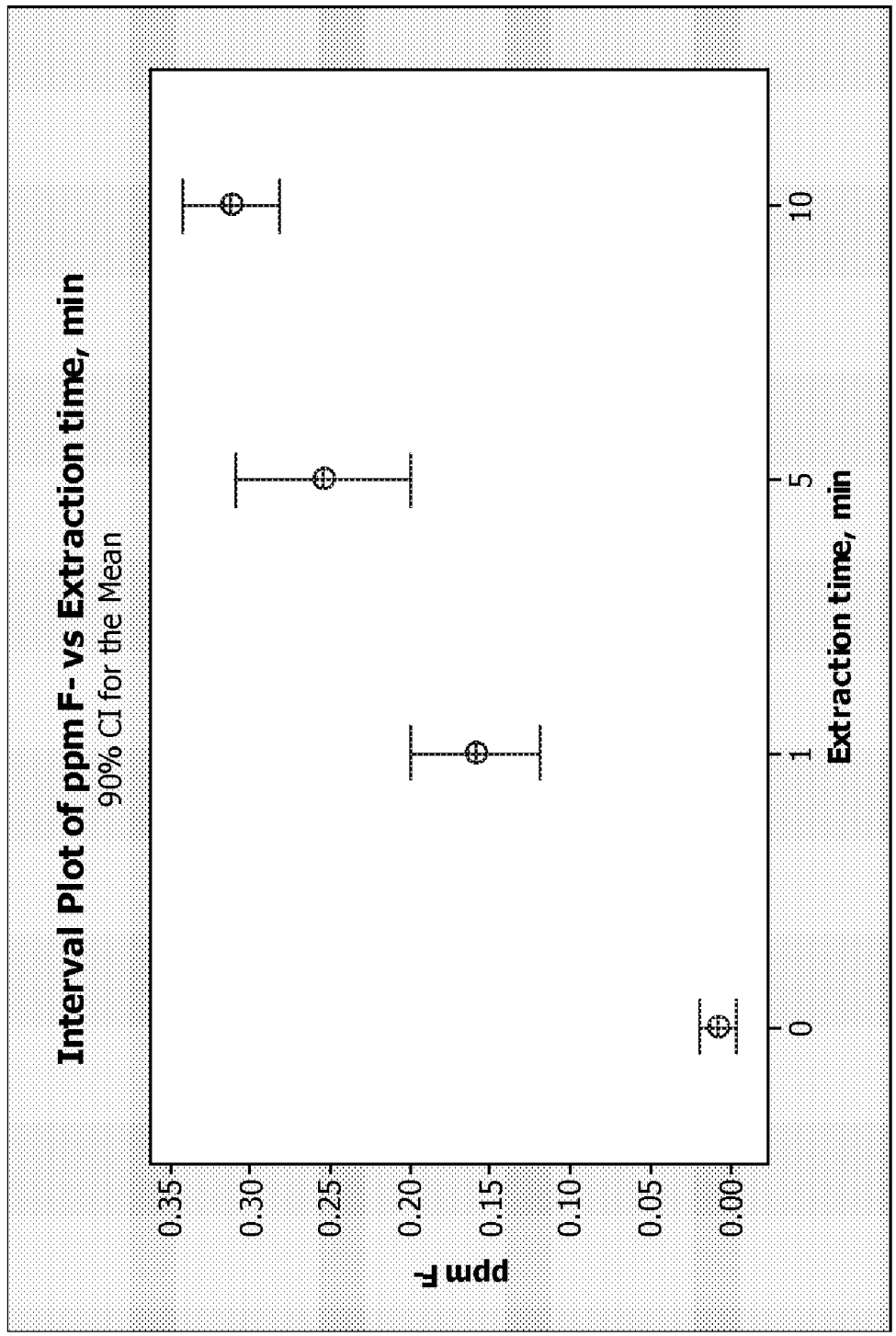
FIG. 2 is a plot representing the extraction of fluoride over a period of time.

FIG. 1 shows a flowchart illustrating at least one exemplary process of the present disclosure. To prolong the useful service life of articles coated with fluoro-refractory coatings an exemplary process for extracting fluorine from fluoro-refractory coatings is disclosed.

Generally, the process for extracting fluorine from a fluoro-refractory coating begins by providing a coated article having disposed thereupon a fluoro-refractory coating at step 10 of FIG. 1. For purposes of illustration, and not to be taken in a limiting sense, the coated article may be a gas turbine engine part having a chromium conversion coating disposed thereupon. The fluoro-refractory coating may nominally comprise oxides of a refractory metal such as hafnium, titanium or zirconium and the like, combined with corrosion inhibiting additives such as oxides of tungsten, molybdenum, chromium, vanadium and the like, and oxides from the base metal such as aluminum oxide. Due to incomplete hydrolysis, these metals are combined with fluorine to form, for example, fluoro-aluminate, fluoro-zirconate, fluoro-titanate, and the like. The articles may comprise a substrate composed of a metal such as steel, zinc, aluminum and magnesium. Although, other refractory metals and metals of the fluoro-refractory coating and substrate, respectively, may be utilized as known and appreciated by one of ordinary skill in the art. For example, the fluoro-refractory coating may comprise a chromium conversion coating.

To remove the fluorine from the fluoro-refractory coating the coated article may be treating hydrothermally at step 12 of FIG. 1 at a temperature and for a period time sufficient to liberate a quantity of fluorine from the fluoro-refractory coating.

In one embodiment of the hydrothermal treatment step, the coated article may be immersed in a quantity of boiling water, for example, boiling deionized water. Generally, the coated article may be immersed for a period of time sufficient to liberate a quantity of fluorine from the fluoro-refractory coating. The quantity being dependent upon the amount of fluorine present in the fluoro-refractory coating of the coated article. As will be appreciated and understood by one of ordinary skill in the art, the temperature and period of time are dependent upon factors such as the quantity of fluorine being extracted, quality of deionized water, quantity of deionized water, and the like. Generally, the coated article may be immersed in a quantity of boiling water at a temperature of about 100° C., that is, the boiling point of water, for a period of about 1 minute to about 15 minutes.

In another embodiment of the hydrothermal treatment step, the coated article may be immersed in a quantity of superheated water, for example, superheated deionized water. The term "superheated water" as used herein means the water is heated above the boiling point of water (100° C.) through the use of an instrument such as an autoclave. Generally, the coated article may be immersed for a period of time sufficient to liberate a quantity of fluorine from the fluoro-refractory coating. The quantity being dependent upon the amount of fluorine present in the fluoro-refractory coating of the coated article. As will be appreciated and understood by one of ordinary skill in the art, the temperature and period of time are dependent upon factors such as the quantity of fluorine being extracted, quality of deionized water, quantity of deionized water, and the like. Generally, the coated article may be immersed in a quantity of superheated water at a temperature of about 120° C. to about 200° C. for a period of about 1 minute to about 15 minutes. The superheated water being subjected to, for example, an autoclave, to raise the temperature to the desired operating range.

In yet another embodiment of the hydrothermal treatment step, the coated article may be contacted with a continuous stream of steam. Generally, the coated article may be steamed for a period of time sufficient to liberate a quantity of fluorine from the fluoro-refractory coating. The quantity being dependent upon the amount of fluorine present in the fluoro-refractory coating of the coated article. As will be appreciated and understood by one of ordinary skill in the art, the temperature and period of time are dependent upon factors such as the quantity of fluorine being extracted, quality of the steam, and the like. Generally, the coated article may be placed in contact with the steam for a period of time sufficient extract the desired quantity of fluorine.

After liberating the fluorine from the fluoro-refractory coating by any one of the aforementioned hydrothermal treatment processes, the hydrothermally treated coated article may be dried at step 14 of FIG. 1 using any one of a number of techniques known to one of ordinary skill in the art.

Experimental Section

TABLE 1

| Sample | Extraction time (minutes) | Fluoride ion amount (parts per million (ppm)) |
|---|---|---|
| Deionized water blank | 0 | 0.01 |
| Aliquot #1 | 1 | 0.15 |
| Aliquot #2 | 1 | 0.17 |
| Aliquot #1 | 5 | 0.25 |
| Aliquot #2 | 5 | 0.26 |
| Aliquot #1 | 10 | 0.31 |
| Aliquot #2 | 10 | 0.32 |

A trivalent chromium conversion coating, commercially available as TCP-HF from Metalast, Inc., Minden, Nev., was applied to a test panel, an Aluminum alloy 2024 T3 test panel, for a period of 10 minutes. The coated test panel was then rinsed in deionized water and allowed to age for thirty (30) days under dry, indoor conditions.

The aged, coated test panel was cut into several coupons, each measuring 1 cm×1 cm, using a laboratory shear. Each coupon was boiled in 25 ml of deionized water for 1 minute, 5 minutes and 10 minutes. A blank of deionized water was also prepared. At the conclusion of the boiling cycle, the aged, coated coupons were removed, and the volume of deionized water was adjusted as necessary to 25 ml to compensate for evaporation.

Aliquots of the 25 ml deionized water samples were analyzed for fluoride content by ion chromatography. As seen in Table 1, measurable concentrations of fluoride were detected in all test specimens exposed to the aged, trivalent chromium conversion coated aluminum coupons.

The results indicate the hydrothermal treatment of the aged, coated coupons did remove fluoride from the chromium conversion coatings and lower the overall content of fluoride from the chromium conversion coatings of the aged, coated coupons.

As will be appreciated by one of ordinary skill in the art, the exemplary processes described herein may be altered as necessary to remove fluorine from any type of fluoro-refractory coating. The removal of fluorine from a coated article having a fluoro-refractory coating extends the useful service life of the part and reduces repair and/or remanufacturing costs pertaining to the part, while also eliminating the possibility of damage or unfavorable interactions with outer coating system elements or nearby components.

One or more embodiments of the present invention have been described. Nevertheless, it will be understood that various modifications may be made without departing from the spirit and scope of the invention. Accordingly, other embodiments are within the scope of the following claims.

What is claimed is:

1. An article comprising a fluorine-free fluoro-refractory coating comprising a chromium conversion coating which contains a refractory metal oxide combined with a corrosion inhibiting additive, said coating being made in accordance with a process comprising the steps of:
   providing an article having said fluoro-refractory coating comprising said chromium conversion coating;
   treating hydrothermally said fluoro-refractory coating at a temperature and for a period time sufficient to liberate fluoride from said fluoro-refractory coating so as to make said coating fluorine-free; and
   drying a hydrothermally-treated article, and
   wherein said fluoro-refractory coating comprises at least one of the following fluoro-refractory compounds: fluoro-hafnate and fluoro-zirconate.

2. The article of claim 1, wherein treating hydrothermally comprises immersing said article in a quantity of boiling water.

3. The article of claim 2, wherein said temperature comprises about 100° C. and said period of time comprises about 1 minute to about 15 minutes.

4. The article of claim 1, wherein treating hydrothermally comprises immersing said article in a quantity of superheated water.

5. The article of claim 4, wherein said temperature comprises about 120° C. to about 200° C. and said period of time comprises about 1 minute to about 15 minutes.

6. The article of claim 1, wherein treating hydrothermally comprises contacting said article with a quantity of steam.

7. A hydrothermally-treated article comprising:

at least one surface having a fluoro-refractory coating disposed thereupon, wherein said fluoro-refractory coating comprises a chromium conversion coating which contains a refractory metal oxide combined with a corrosion inhibiting additive, said refractory metal oxide comprising an oxide of one of hafnium, titanium and zirconium; and wherein said fluoro-refractory coating is free of fluoride and comprises at least one of the following fluoro-refractory compounds: fluoro-hafnate and fluoro-zirconate.

8. The article of claim 7 wherein said corrosion inhibiting additive comprises an oxide of one of tungsten, molybdenum, chromium and vanadium.

* * * * *